No. 622,708. Patented Apr. 11, 1899.
W. G. PAGE.
EVAPORATING PAN.
(Application filed Mar. 10, 1897. Renewed June 28, 1898.)
(No Model.) 2 Sheets—Sheet 1.
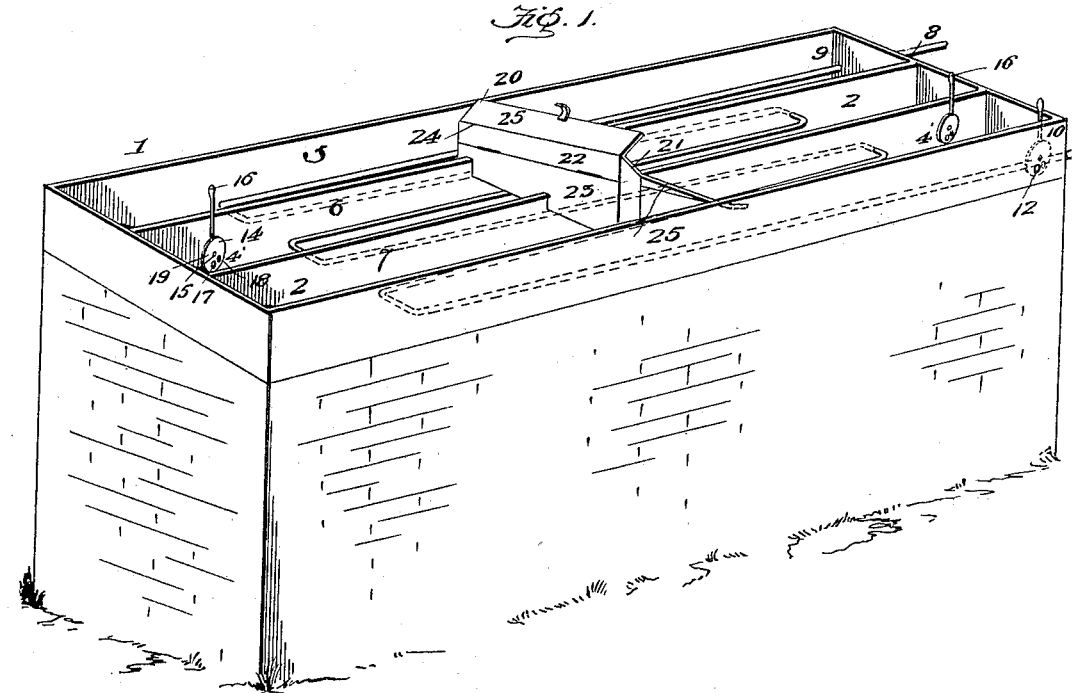
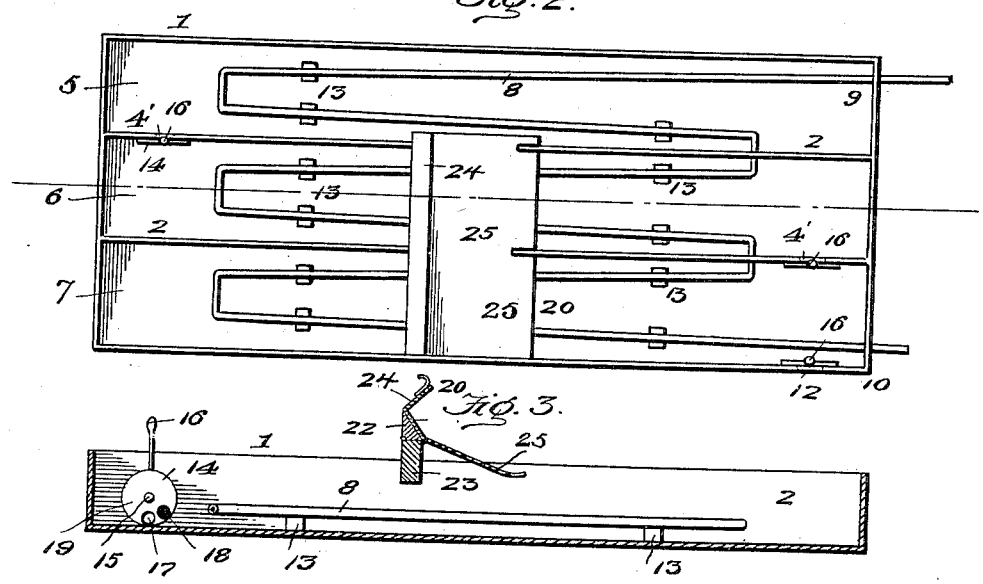
Witnesses
Inventor
William G. Page
by H. B. Willson
Attorney
THE NORRIS PETERS CO., PHOTO-LITHO., WASHINGTON, D. C.

No. 622,708. Patented Apr. 11, 1899.
W. G. PAGE.
EVAPORATING PAN.
(Application filed Mar. 10, 1897. Renewed June 28, 1898.)

(No Model.) 2 Sheets—Sheet 2.

Witnesses
Inventor
William G. Page
by H. B. Willson
Attorney

UNITED STATES PATENT OFFICE.

WILLIAM GARDNER PAGE, OF CALVIN, INDIAN TERRITORY.

EVAPORATING-PAN.

SPECIFICATION forming part of Letters Patent No. 622,708, dated April 11, 1899.

Application filed March 10, 1897. Renewed June 28, 1898. Serial No. 684,688. (No model.)

*To all whom it may concern:*

Be it known that I, WILLIAM GARDNER PAGE, a citizen of the United States, residing at Calvin, Indian Territory, have invented certain new and useful Improvements in Evaporating-Pans for Sorghum-Making; and I do declare the following to be a full, clear, and exact description of the invention, such as will enable others skilled in the art to which it appertains to make and use the same.

My invention has relation to evaporating-pans for sorghum-making; and the object is to provide a simple, cheap, and convenient device of this kind; and to this end the novelty consists in the construction, combination, and arrangement of parts, as will be hereinafter more fully described, and particularly pointed out in the claims.

In the accompanying drawings the same numerals of reference indicate the same parts of the invention.

Figure 4:
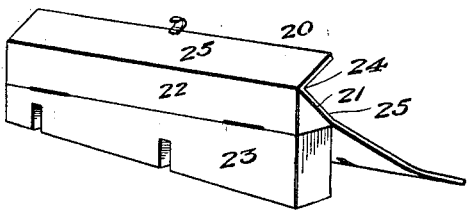
Figure 5:
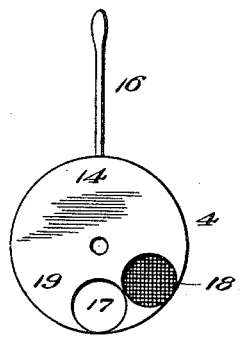
Figure 6:
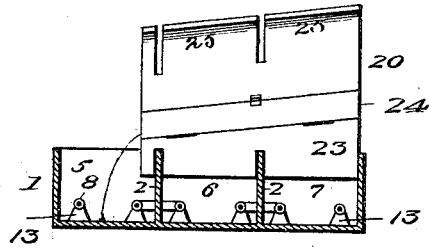

Figure 1 is a perspective view of my improved evaporating-pan as it appears in operation. Fig. 2 is a top plan view of the same. Fig. 3 is a longitudinal section through one of the sections. Fig. 4 is a detail of the skimming device. Fig. 5 is a detail of one of the rotary gates. Fig. 6 is a transverse section showing the skimmer elevated to return the scum to the first vat.

1 represents the pan proper, and it is preferably rectangular in shape and of any suitable dimensions.

2 2 are rigid partitions, each of which is provided with a circular strainer-gate 4, which opens and closes the communication 4' between the vats 5 6 7.

8 is a steam-pipe which enters the first pan 5 at its end 9 and extends back and forth from the vat 5 through the vats 6 7, as shown, and its exhaust end extends through the end 10 of the vat 7 and exhausts into the air, and the entire pan is set at an inclination downward from the vat 5 to the end 10 of the vat 7, so that any water the result of condensation in the pipe 8 will flow out its end 10 by gravity, and this inclination also allows the juice to flow from the first vat 5, through vats 6 7, and out of vat 7 through the orifice or outlet 12, which is also protected by a strainer-gate 4. The steam-pipe 8 is preferably raised a short distance above the bottom of the pan by means of V-shaped blocks 13, which allows the juice to circulate entirely around the said pipe and at the same time permits a free passage of the juice on the bottom of the pan under the pipe.

The orifice 4' is located in the opposite end of each partition, at the bottom thereof, and each one is provided with a circular plate 14, rotating on a screw-stud 15, secured to one side of the partition, and it is provided with a handle 16, by means of which said circular plate is operated. This plate 14 is provided with an opening 17, corresponding in size and position to the orifice 4' in the partition, and with a strainer 18, similarly located, the solid or non-perforated portion 19 of the plate acting as a valve or cut-off to entirely prevent the flow of the juice from one vat to the other. It will be seen that this plate or valve 14 has three functions when it is manipulated by the handle 16. The first is when the solid portion 19 is brought in front of the orifice 4' in the partition all communication is cut off; second, when the foraminous portion 18 is opposite the orifice 4' the juice is strained as it passes from one vat to the other, and, third, when the opening 17 is in line with said orifice in the partition a free and uninterrupted flow of the juice is permitted.

The juice in the vats 5 and 6 contains the major part of the scum, and as this rises to the surface it is skimmed off by hand; but as the juice is considerably boiled down and much thicker in the vats 6 and 7 I prefer to skim the juice in these vats and return it to the first vat, and this skimming operation is performed mechanically and effectually as follows: A sheet-metal plate 20 is mounted on the inclined face 21 of a block 22, which is hinged to a carriage 23, which slides on the partitions 2 2. This plate 20 is preferably formed of a single piece of sheet metal, of which 24 is the transverse trough, and 25 25 two wings or skimmers which extend down into the vats 6 and 7, and as the carriage is moved along they skim the surface of the juice, and when the carriage arrives at the end of the vats the skimmer is tilted up, as shown in Fig. 6, when it will be seen the scum runs into the inclined trough and from it into the vat 5. This operation may be performed as often as necessary.

Having thus fully described my invention, what I claim as new and useful, and desire to secure by Letters Patent, is—

1. The combination with the evaporating-pan, substantially as described, of the circular plate 14, secured to one of the partitions thereof and provided with a solid portion 19, a perforated strainer 18 and an opening 17, as and for the purpose set forth.

2. The combination with the evaporating-pan, comprising the vats 5, 6, 7, of the skimmer 20, formed with the wings 25, the transverse trough 24, mounted on the inclined block 22, hinged to the carriage 23, substantially as and for the purpose set forth.

In testimony whereof I hereunto affix my signature in presence of two witnesses.

WILLIAM GARDNER PAGE.

Witnesses:
 W. G. D. HINDS,
 M. M. WINNINGHAM.